Figures 1, 2, 3, 4:
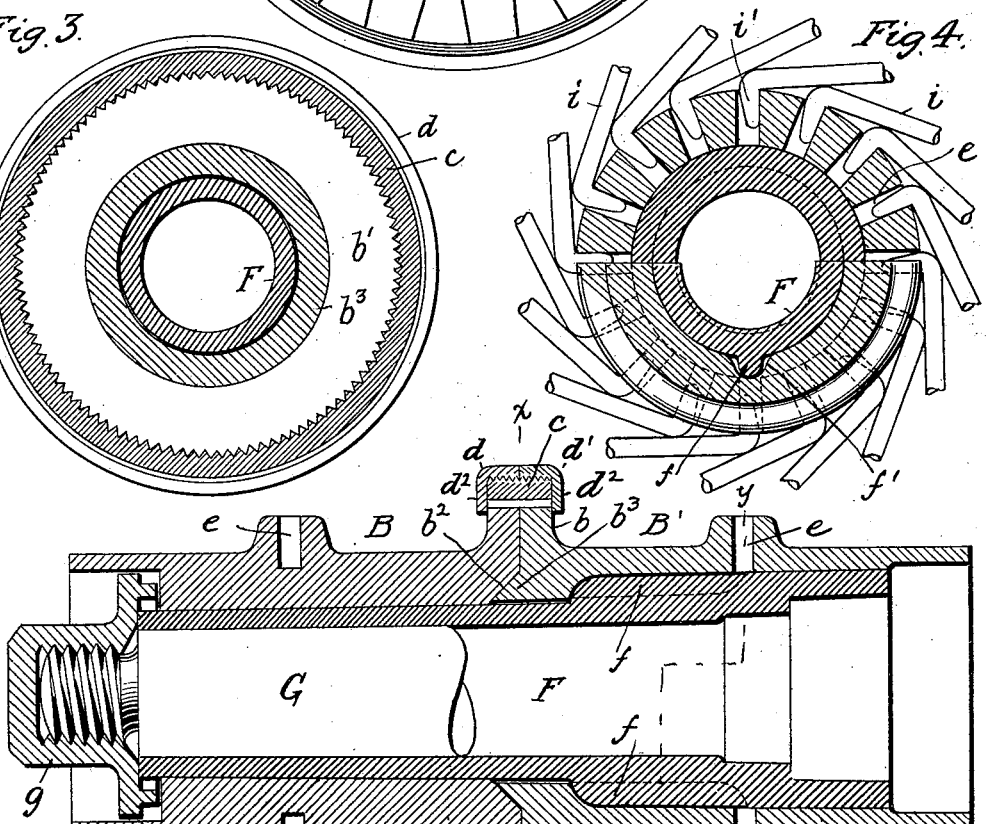

No. 712,875. Patented Nov. 4, 1902.
S. B. WHITESIDE.
VEHICLE WHEEL.
(Application filed Feb. 8, 1902.)
(No Model.)

Witnesses
Inventor
Sidney B. Whiteside
by his Attorney

UNITED STATES PATENT OFFICE.

SIDNEY B. WHITESIDE, OF NEW YORK, N. Y., ASSIGNOR TO WHITESIDE WHEEL COMPANY, LIMITED, OF GRAND RAPIDS, MICHIGAN.

VEHICLE-WHEEL.

SPECIFICATION forming part of Letters Patent No. 712,875, dated November 4, 1902.

Application filed February 8, 1902. Serial No. 93,178. (No model.)

*To all whom it may concern:*

Be it known that I, SIDNEY B. WHITESIDE, a citizen of the United States, residing at the city of New York, in the borough of Manhattan and State of New York, have invented certain new and useful Improvements in Vehicle-Wheels, of which the following is a full, clear, and exact description.

This invention relates to metallic vehicle-wheels, the object being to provide a wheel which will be strong and durable and which can be manufactured at low cost.

The invention consists of the constructions and combinations of parts hereinafter described, and pointed out in the claims.

In the accompanying drawings, Figure 1 is a side elevation of the wheel complete. Fig. 2 is a section through the hub, taken on the plane of the axis. Fig. 3 is a section on the line $x\ x$ of Fig. 2; and Fig. 4 is a section on line $y\ y$ of Fig. 2, showing portions of the spokes.

A indicates the rim of the wheel, which may be adapted for a metal, cushion, or other form of tire, as desired. It is perforated at regular intervals to allow the spokes to pass through it and the heads on the spokes to be seated on the outer side of the rim in a usual manner.

B and B' indicate two parts composing the hub of the wheel, the parts being separated on a plane substantially at right angles to the axis of the wheel and with their ends abutting practically at the middle of the hub. The abutting ends carry flanges $b$, forming large bearing-faces $b'$. One of these bearing-faces is either grooved or provided with a receding surface $b^2$, into or against which a projecting portion $b^3$ on the other bearing-face projects in order to aline the parts and maintain them on the same axis. The rims of the flanges $b$ are provided with serrations or teeth extending all the way around, all teeth of the same size and shape, so that the two parts of the hub can be adjusted with respect to each other in a circumferential direction and fixed at a position where the teeth and the spaces between them will be in line with each other across the two flanges.

$c$ is a locking-ring having internal teeth similar in size and shape to those on the flanges of the hub, so that the ring may be slipped over the two flanges and by its engagement with the teeth on both of them lock the two parts of the hub against relative circumferential movement. The outer surface of this ring $c$ is also provided with a screw-thread, and two rings or nuts $d$ and $d'$, each having a flange $d^2$, are adapted to screw upon the opposite sides of the ring $c$ to bring their flanges $d^2$ up against the flanges $b$ and $b'$, respectively, to thus confine the ring $c$ and prevent it from slipping laterally out of engagement with the teeth on the hub.

At a suitable distance from the middle line of the hub each part B and B' is provided with a row of substantially radial holes $e$, adapted to receive the ends of the spokes, as will be hereinafter described. The interior of the hub may be constructed to receive a box for the axle or the hub may at the same time serve as a box. I have, however, shown a box F, and a feature of my invention consists in adapting the hub to receive the standard shape and size of box commonly used in wooden wheels. Such boxes are usually provided near their larger end with two wings or ribs $f$, diametrically located and extending lengthwise of the box. When the box is driven into the wooden hub, these wings penetrate the wood and prevent the box from turning with respect to the hub. I therefore construct one part of my metal hub B' with longitudinal grooves $f'$, into which the wings $f$ will seat when the box is introduced into the hub. The wings will then serve the same purpose in the metal hub as they do in the wooden hub and the boxes become interchangeable. A portion of the axle G is shown in Fig. 2, as well as the end nut $g$, preventing the wheel from running off the axle.

Two sets of spokes are used in this wheel, they being of wire or rods of the usual character common in such wheels and all being alike in size and shape. Each spoke $i$ is provided at its outer end with a head (not shown) to prevent it from being pulled through the rim, and at its inner end it is provided with a hook $i'$, formed by bending the extremity of the spoke at an angle preferably slightly less than a right angle. One set of spokes leads from the rim to the openings $e$ in one of the parts of the hub, while the spokes of the other set lead to the openings e in the other part of the hub. The spokes of each set occupy substantially tangential positions with respect to the hub, and the spokes of one set lead from the hub to the rim in an opposite direction or at the opposite angle to that of the other set. The hooks on the inner ends of the spokes engage with the hub by passing into the holes e, and the tangential position of the spokes necessitates that each spoke shall rest upon or immediately above the top of the next succeeding spoke, thus preventing it from becoming removed from its hole in the hub. The spokes are therefore interlocking and self-locking. It is not essential that the successive spokes should touch each other so long as they are near enough to prevent the hooked ends from leaving the holes. It will thus be seen that in the assembling of this wheel there are no nuts to be set up and no adjustments to be made. It is simply a process of threading the spokes through the holes in the rim and leading them to successive holes in the hub and then seating the hooks in the holes. When all the spokes have thus been set in place, the wheel is made rigid by using a wrench or similar appliance to rotate the two parts of the hub B and B' upon each other in opposite directions. This puts the tension on both sets of spokes at once and imparts a uniform tension simultaneously to every spoke in the wheel. Having thus applied the proper tension to the wheel, the two parts of the hub are locked together by applying the locking-ring c, which prevents the return of the hub parts to the slack position, as before described. Then to guard against the displacement of ring c the two nuts d and d' are screwed on, which not only confine the ring c, but also bind the parts of the hub together.

It is obvious that my invention is not limited to the details of construction—as, for instance, to the angle or shape of the holes e, which receive the spokes, or the exact angle at which the spokes run from the hub to the rim, or to the relative angles of the two sets of spokes—since these matters are all to be determined by the conditions of use and nature of the vehicle to which the wheel is to be applied; but it is pointed out that a more "springy," and hence a more easy riding, wheel is obtained by running the spokes substantially tangent to the hub than by running them direct or radial.

Having described my invention, I claim—

1. A vehicle-wheel consisting of a rim, a hub in two parts separated on a plane transverse to the axis, two sets of spokes connecting the rim with the respective parts of the hub, means whereby said parts may be adjusted in a circumferential direction with respect to each other, each part being provided with corresponding circular rows of teeth adapted to line up with each other, and a ring adapted to engage with both rows of teeth to lock the parts of the hub against relative movement.

2. A vehicle-wheel consisting of a rim, a hub in two parts separated on a plane transverse to the axis, two sets of spokes connecting the rim with the respective parts of the hub, means whereby said parts may be adjusted in a circumferential direction with respect to each other, each part being provided with corresponding circular rows of teeth adapted to line up with each other, a ring adapted to engage with both rows of teeth to lock the parts of the hub against relative movement and means to hold said ring in place.

3. A vehicle-wheel consisting of a rim, a hub in two parts separated on a plane transverse to the axis, two sets of spokes connecting the rim with the respective parts of the hub, means whereby said parts may be adjusted in a circumferential direction with respect to each other, each part being provided with corresponding circular rows of teeth adapted to line up with each other, a ring adapted to engage with both rows of teeth to lock the parts of the hub against relative movement, said ring being also provided with a thread and flanged nuts screwed on said thread and preventing the displacement of said ring.

4. In a vehicle-wheel, the combination of a hub and spokes, the spokes occupying a substantially tangential position with respect to the hub, the inner end of one spoke passing over the inner end of the next succeeding spoke to hold the latter in place, substantially as described.

5. In a vehicle-wheel, the combination of a hub and spokes, the spokes being substantially tangential to the hub and having hooks at their inner extremities engaging with holes in the hub, the inner end of one spoke acting as a lock to prevent the removal of the next succeeding spoke from its hole in the hub.

6. In a vehicle-wheel, the combination of a hub and spokes, the spokes being substantially tangential to the hub and having hooks at their inner extremities engaging with holes in the hub, the inner end of one spoke passing over the inner end of the next succeeding spoke and thereby preventing the hook on the latter from leaving its hole in the hub.

7. A vehicle-wheel consisting of a rim, a hub in two parts, two sets of spokes extending from the rim to the respective parts of the hub, the direction of the spokes of one set being at opposite angles to those of the other, said direction being nearer tangent than radial.

In witness whereof I subscribe my signature in presence of two witnesses.

SIDNEY B. WHITESIDE.

Witnesses:
WM. A. ROSENBAUM,
WALDO M. CHAPIN.